US006905206B2

(12) United States Patent
Skuro

(10) Patent No.: US 6,905,206 B2
(45) Date of Patent: Jun. 14, 2005

(54) RETRACTABLE EYEWEAR RETAINING STRAP ASSEMBLY

(76) Inventor: John Michael Skuro, 2033 Lone Pine Rd., Virginia Beach, VA (US) 23451

( * ) Notice: Subject to any disclaimer, the term of this patent is extended or adjusted under 35 U.S.C. 154(b) by 0 days.

(21) Appl. No.: 10/807,891

(22) Filed: Mar. 24, 2004

(65) Prior Publication Data

US 2004/0189930 A1 Sep. 30, 2004

Related U.S. Application Data

(60) Provisional application No. 60/457,133, filed on Mar. 25, 2003.

(51) Int. Cl.[7] .................................. G02C 5/20
(52) U.S. Cl. .................. 351/118; 351/113; 351/117; 351/156
(58) Field of Search .................. 351/118, 113, 351/117, 156, 111, 119, 157, 158, 41; 2/453

(56) References Cited

U.S. PATENT DOCUMENTS 4,479,703 A * 10/1984 Enghofer ................... 351/123
5,790,228 A * 8/1998 Bell, III ..................... 351/118
6,547,388 B1 * 4/2003 Bohn ......................... 351/118
6,843,562 B1 * 1/2005 Ng ............................ 351/118

* cited by examiner

Primary Examiner—Hung Xuan Dang
(74) Attorney, Agent, or Firm—John M. Brandt

(57) ABSTRACT

A retractable eyeware retaining strap assembly consisting of a strap and a hollow eyewear temple for containing the strap, a strap retaining block to which the strap is attached positioned within the temple and arranged to slide along the temple, an elastic member such as an extendable spring connected between the block and the eyewear end of the temple and fastening means attached to the strap at the temple end for fastening the withdrawn strap to the eyewear. A block locking device is provided to secure the block at a desired position along the temple, particularly at one end or the other. The strap is withdrawn by releasing the block at the eyewear end of the temple and retracted by releasing the block at the temple end.

14 Claims, 4 Drawing Sheets

RETRACTABLE EYEWEAR RETAINING STRAP ASSEMBLY

CROSS REFERENCE TO RELATED APPLICATIONS

This application is based on the disclosure of Provisional Application Ser. No. 60/457,133, filed Mar. 25, 2003 which is hereby incorporated by reference.

BACKGROUND OF THE INVENTION

1. Field of the Invention

The invention relates to devices for securing eyewear to the body of a wearer and more particularly relates to retaining straps connected to eyewear temple members for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units, which remain external to the eyewear unless removed.

U.S. Pat. No. 4,479,703, Enghofer, discloses a retaining assembly wherein the retaining straps are elastic and retract of there own elasticity into hollow temples. As both of the straps are elastic, this approach does not provide for a passive retractable strap which will allow the eyewear to-hang loosely when-not worn on-the head.

In contrast, the present invention provides a retractable assembly for both elastic and inelastic straps so that both an active mode, i.e., secured to the head, and passive mode are available. Additionally, the invention allows the straps to be completely retracted when neither form of use is desired.

SUMMARY OF THE INVENTION

The invention may be summarized as an assembly which provides a retractable retaining strap for head worn eyewear. By eyewear is meant any framelike device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

The assembly is composed of a hollow temple which contains a retractable retaining strap, a block slideably disposed in the temple to which the strap is attached, and an elastic member such as an extendable spring. The elastic member is positioned between and attached to the block and frame end of the temple.

A locking device is provided to secure the block in the temple at a selected position along the length of in the temple, in particular, at each end of the temple. A fastening arrangement is located at the end of each strap opposite the strap end secured to the block which fastens the strap to another portion of the eyewear, for example, an opposite temple or strap end.

The strap disposed in the hollow temple may be either inelastic or stretchable allowing combinations of strap length and retaining tension at the option of the wearer. For example, if a pair of strap containing temples are provided either as substitutes for temples of previously acquired eyewear or as part of a complete eyewear assembly, one temple may contain an elastic strap and the other, an inelastic strap. The straps are separately withdrawn by releasing the block at the frame end and relocking at the opposite or temple end adjacent to the ear. Means may also be provided at the temple end to further secure the strap within the temple when not in use, This may include a second lockable block or a force fit assembly attached to the strap fastenable end.

With both straps retracted, the eyewear is in a normal state without the retaining feature of the invention. When the elastic strap only is withdrawn and fastened, the eyewear will be retained about the head. When the inelastic strap only or both the inelastic and elastic straps are withdrawn and coupled, the eyewear may be held about the neck or on the forehead.

These, and other features and advantages of the invention will become more evident from the description of the preferred embodiment in conjunction with the drawings which follows.

DESCRIPTION OF THE PREFERRED EMBODIMENT

Figure 1:
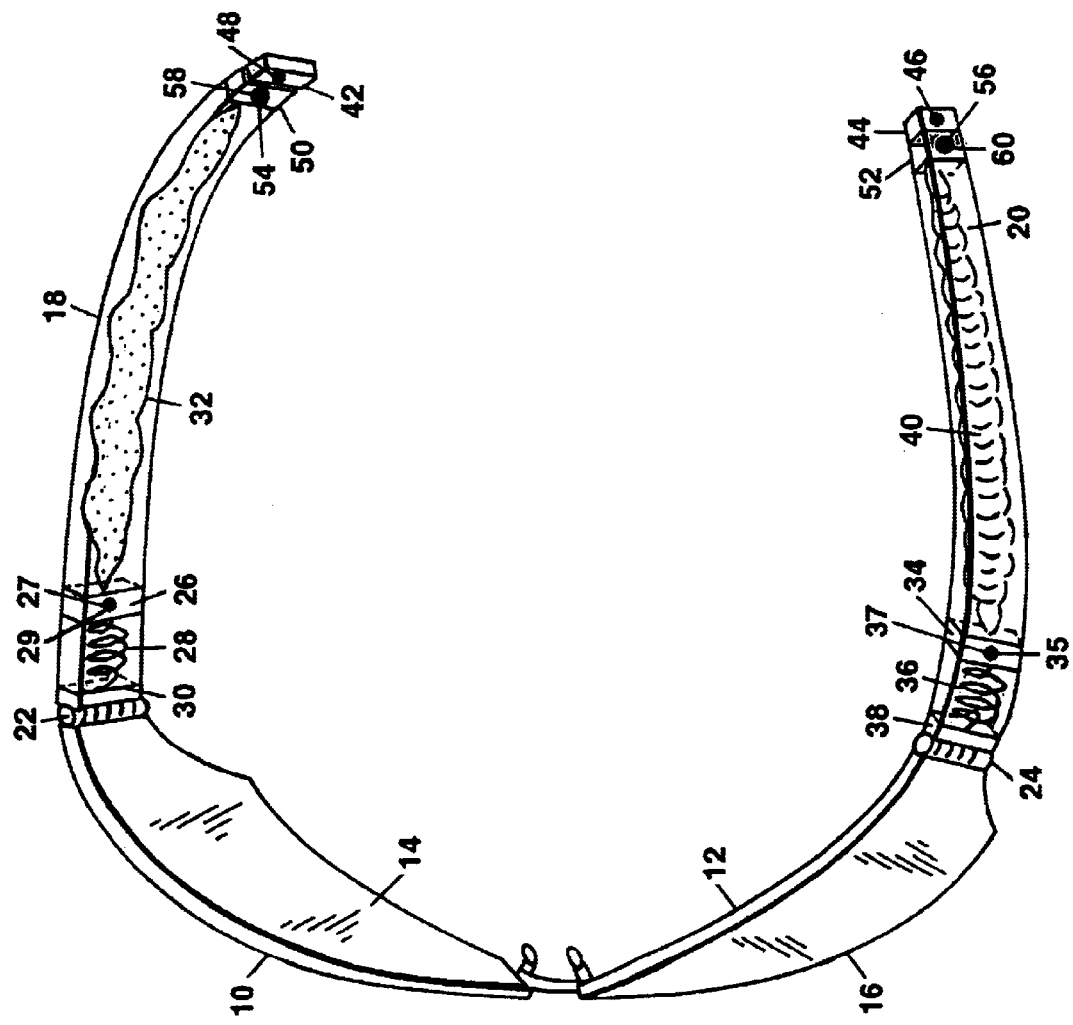
FIG. 1 is a partially cut away perspective view of the preferred embodiment of the invention in a first configuration of use.

Referring first to FIG. 1, there is shown a partially cutaway perspective view of the preferred embodiment of the invention. Eyewear 10, a pair of sunglasses for example, consists of frame 12 supporting lenses 14 and 16 and a pair of hollow temples 18 and 20 secured to flame 12 by hinges 22 and 24 respectively. Disposed within temple 18 are sliding block 26, spring 28 or similar such elastic or extendable device mounted between block 26 and temple frame end 30, and inelastic retaining strap 32. Disposed within temple 20 are sliding block 34, spring 36 or similar such elastic or extendable device mounted between block 34 and temple frame end 38, and elastic retaining strap 40.

In addition to being inelastic or stretchable, straps 32 and 40 may be constrained to a particular size or diameter which fits within the temples or may be composed of a sheet material which expands upon removal and then furls or folds up upon retraction.

Blocks 26 and 34 have depressable spring biased balls 27 and 35 respectively which seat in temple recesses 29 and 37 respectively for locking blocks 26 and 34 at the fame ends of the temples.

At the end of each strap is attached a fastening arrangement shown as clasp member 42 for strap 32 and clasp member 44 for strap 40. As illustrated, the fastening arrangement consists of mating male and female blocks employing a spring biased ball 46 in male block 44 which ball seats into recess 48 in female block 42 upon connection. Other fastening arrangements such as a hook and eye may also be used.

When the retaining straps are retracted into the temple by the force of springs 28 and 36 as is shown in FIG. 1, an arrangement may be provided to further secure the straps fastenable ends inside the temples. For example, a lockable block 50 or 52 having depressable a spring biased ball 54 or 56 seating in recesses 58 or 60 in the respective temples 18 or 20 will provide a means for preventing the strap from being removed without first releasing block 50 or 52 by depressing ball 54 or 56. Similarly, clasp members 42 and 44 may have extensions which tightly press into the temple ends.

Figure 2:
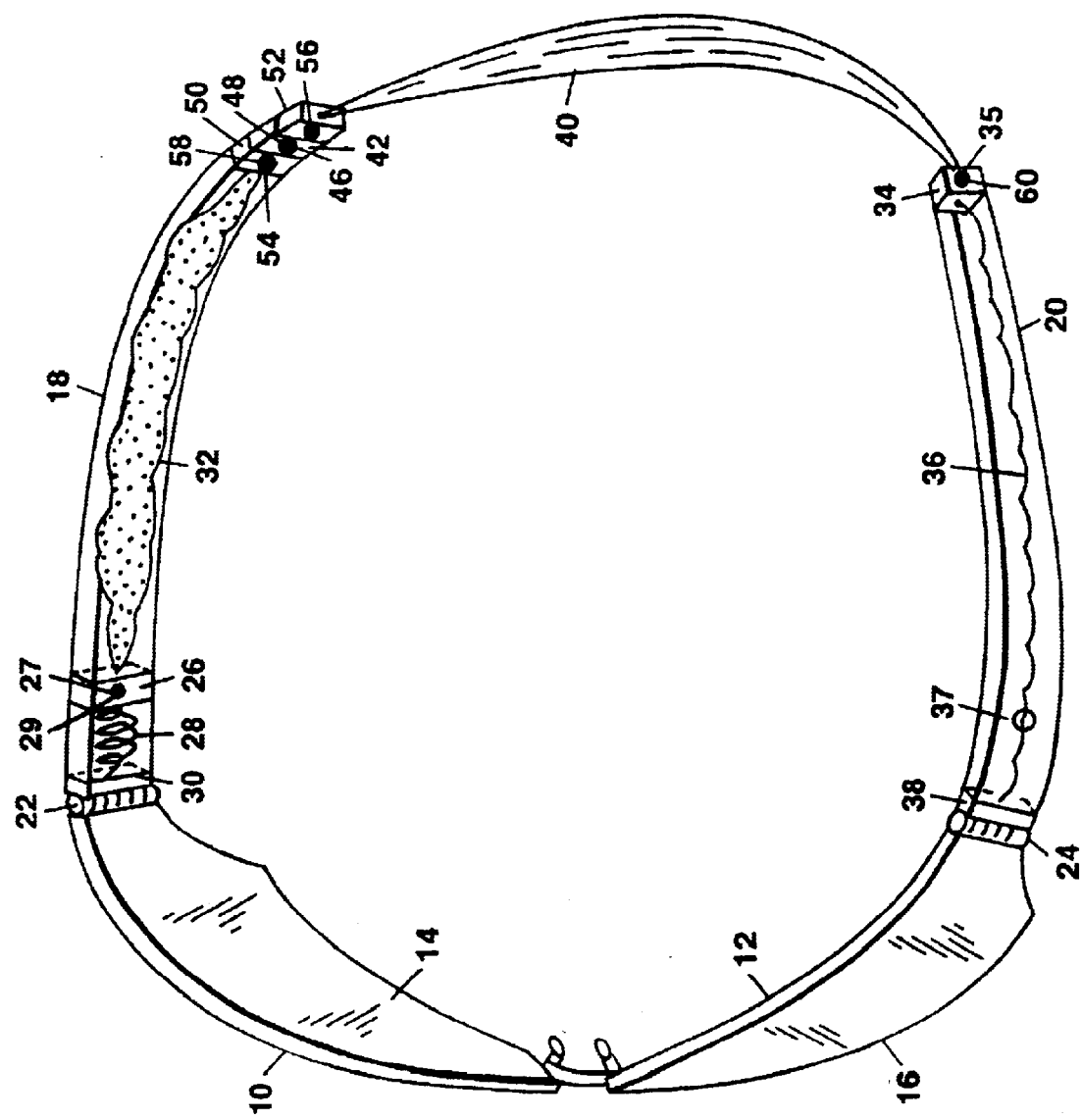
FIG. 2 is the view of FIG. 1 in a second configuration of use.

Referring next to FIG. 2, the same embodiment as that of FIG. 1 is illustrated in a condition of use wherein eyewear 10 is held in place on the head by withdrawing elastic strap 40 from temple 20. This is accomplished by first depressing ball 56 in block 52 to release the temple or fastening end of the strap from its secure position as described above. Then ball 35 is depressed in block 34 to allow block 34 to slide within temple 20 to the end where it will relock by seating ball 35 in the same recess 60 as held ball 56 of block 52.

Strap 40 is fastened to the opposite side of the eyewear around the head by the fastening arrangement of engaging mating blocks 44 and 48 as described above. As shown, spring 36 is fully extended and will retract strap 40 into temple 20 when the fastening or catch arrangement is disengaged and block 34 is released by depressing ball 35.

Figure 3:
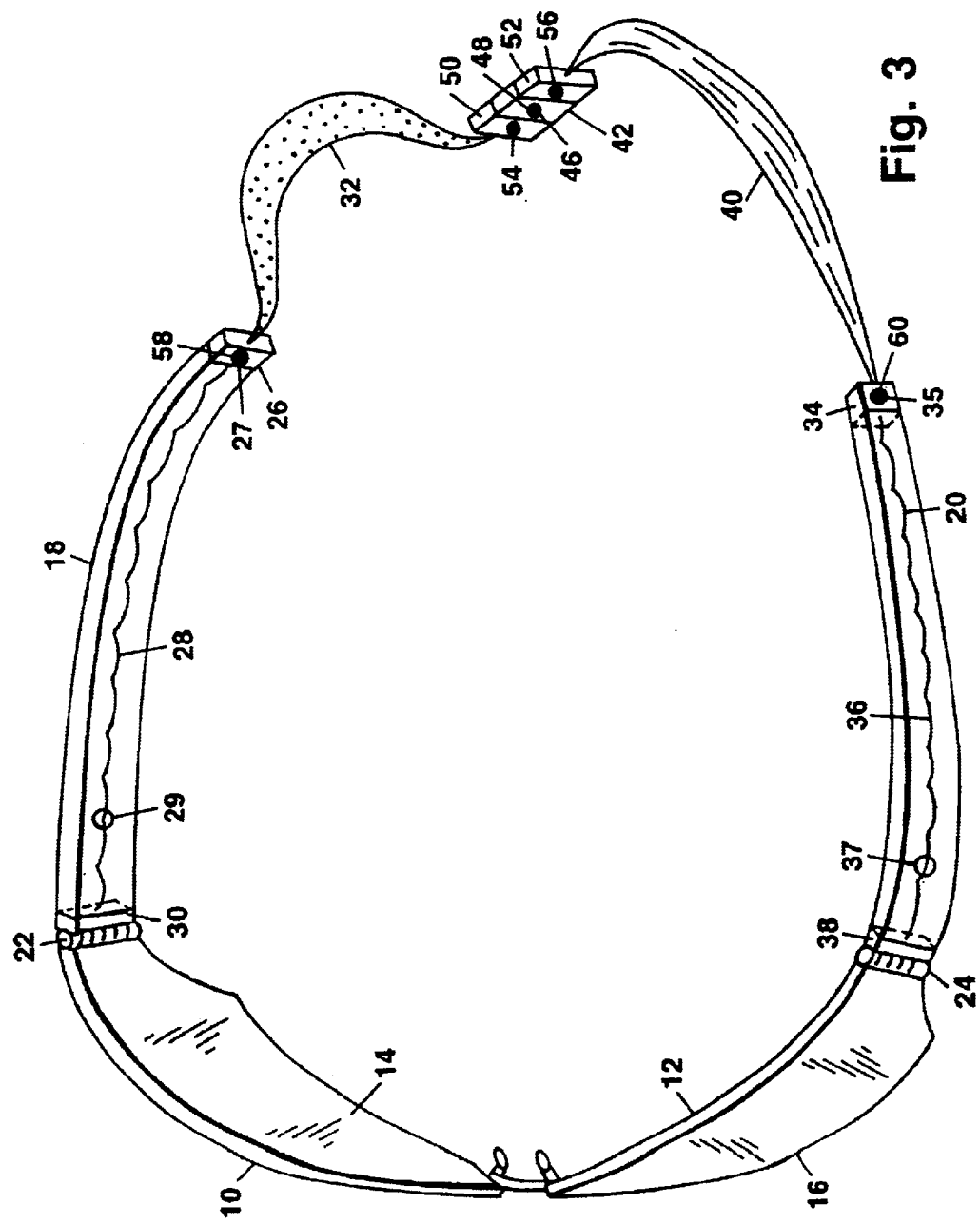
FIG. 3 is the view of FIG. 1 in a third configuration of use.

FIG. 3 shows an additional condition of use which allows the eyewear to be removed from the eye position and hang loose over the neck or up on the forehead. This involves, the removal of the additional inelastic strap 32 from temple 18 by the same procedure used to withdraw strap 40. First release the temple or the fastenable end of the strap from its secure position by depressing ball 54 in block 50 and then depressing ball 27 in block 26. This allows block 26 to slide within temple 81 to the end where it reseats in recess 58 locking strap 32 in the withdrawn position. The strap is then fastened as in the description of FIG. 2. Spring 28 will retract strap 32 when the procedure is reversed.

Figure 4:
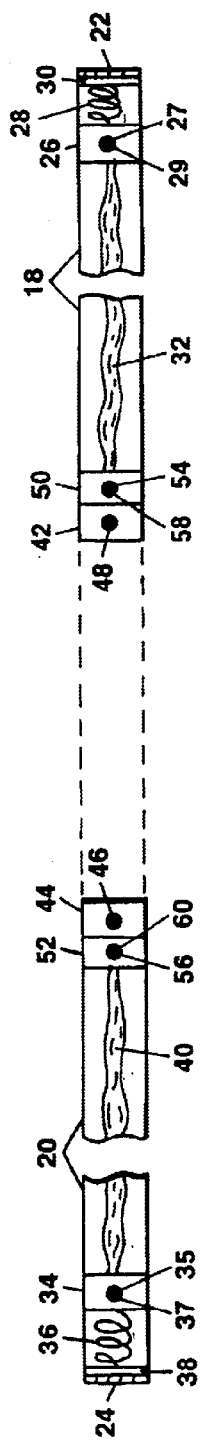
FIG. 4 is a schematic representation of the structural arrangement of FIG. 1.
Figure 5:
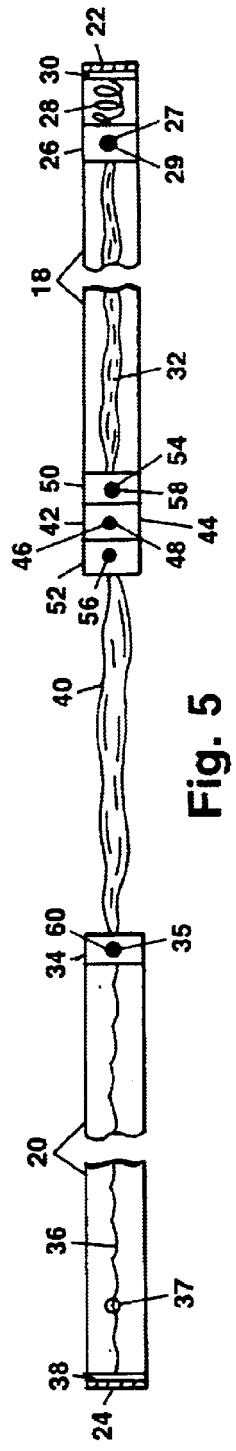
FIG. 5 is a schematic representation of the structural arrangement of FIG. 2.
Figure 6:
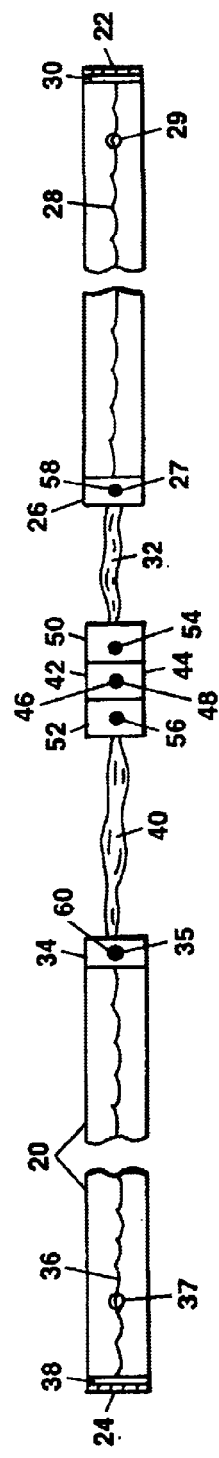
FIG. 6 is a schematic representation of the structural arrangement of FIG. 3.

Referring next to FIGS. 4, 5, and 6, schematic representations of FIGS. 1, 2, and 3 are presented to further illustrate the position of the components of the invention in the various conditions of use described above. All views are looking forward through the lenses and all numerical identifications are exactly the same as previously described.

Figure 7:
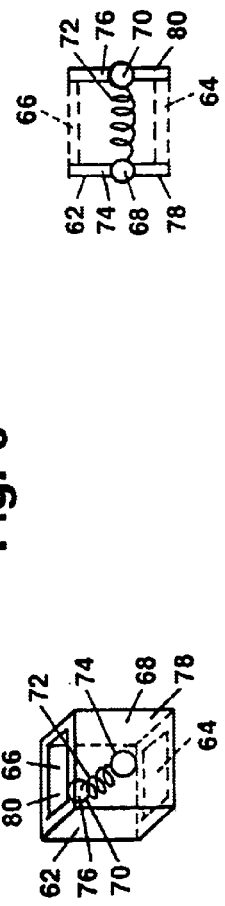
FIG. 7 is a perspective view of a component of FIG. 1.

FIG. 7 is a perspective illustration of the form of block component disposed inside the temples at each end for the purpose of securing the straps in place, either extended or retracted. Block 62, a thin walled structure comprised, for example, of plastic, is arranged to fit within the hollow temples of the invention. The bottom 64 and top 66 are open to provide access for the insertion of balls 68 and 70 biased by spring 72 into recesses 74 and 76 in walls 78 and 80.

Figure 8:
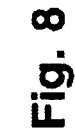
FIG. 8 is a cross sectional view of the component of FIG. 7.

In use, balls 68 and 70 fit into corresponding recesses in the temples preventing the movement of the block until the balls are depressed. The balls reseat when the block is slid or replaced in a chosen position. FIG. 8 is a cross-sectional illustration of the block of FIG. 7 further clarifying the structure of the block.

As variations in the above described preferred embodiment may be made within the general concept of the disclosure, the invention is accordingly defined by the following claims.

What is claimed is:

1. A retractable eyewear retaining strap assembly for an eyewear frame comprising in combination:
    A. a hollow temple having a strap receiving end and an eyewear frame attachable end hingeably attachable to said frame;
    B. a strap securing block member slideably disposed within said temple;
    C. an eyewear retaining strap disposed within said temple and connected to said block member, said strap withdrawable from said hollow temple at said strap receiving end;
    D. an elastic member disposed within said temple connected between said block member and said temple eyewear frame attachable end;
    E. fastening means attached to said eyewear retaining strap, said fastening means attachable to said eyewear; and
    F. lock means for securing said block member at a selected position within said temple whereby said strap may be withdrawn from said temple and secured behind the head of an eyewear user to said eyewear.

2. The assembly of claim 1 wherein said elastic member comprises an extendable spring.

3. The assembly of claim 1 wherein said strap is elastic.

4. The assembly of claim 1 wherein said strap is inelastic.

5. The assembly of claim 1 wherein said lock means comprises a spring biased ball disposed in said block member, said ball arranged to seat within a recess disposed in said temple.

6. The assembly of claim 1 further including strap securing means disposed between said strap and said fastening means, said strap securing means arranged to fit into said temple at said strap receiving end.

7. The assembly of claim 6 wherein said strap securing means comprises a second block arranged to fit within said temple, said second block having a spring biased ball arranged to seat within a recess disposed in said temple.

8. Eyeware comprising in combination:
    A. an eyewear frame for containing a pair of lenses;
    B. a pair of hollow temples each having a strap receiving end and an eyewear frame attachable end, one each hingeably attached to an opposite side of said eyewear frame at said eyewear frame attachable end;
    C. a strap securing block member slideably disposed within each said temples;
    D. an eyewear retaining strap disposed within each of said temples and connected one each to each of said block members, said straps withdrawable from said hollow temples at said strap receiving ends;
    E. an elastic member disposed within each of said temples connected one each between each of said block members and said temple attachable ends;
    F. fastening means attached to each of said eyewear retaining straps, said fastening means attachable to one another; and
    G. lock means for securing each of said block members at a selected position within each of said temples whereby each of said straps may be withdrawn from said temples and secured to one another behind the head of an eyewear user.

9. The assembly of claim 8 wherein said elastic members comprise an extendable spring.

10. The assembly of claim 8 wherein at least one of said straps is elastic.

11. The assembly of claim 8 wherein at least one of said straps is inelastic.

12. The assembly of claim 8 where in said lock means comprises a spring biased ball disposed in each of said block members, said ball arranged to seat within a recess disposed in each of said temples.

13. The assembly of claim 8 further including strap securing means disposed between said straps and said fastening means, said strap securing means arranged to fit into said temples at said strap receiving ends.

14. The assembly of claim 13 wherein said strap securing means comprises a second block arranged to fit within said temple, said second block having a spring biased ball arranged to seat with in a recess disposed in said temple.

\* \* \* \* \*